(12) United States Patent
Kutowy et al.

(10) Patent No.: US 9,993,775 B2
(45) Date of Patent: Jun. 12, 2018

(54) USED OIL RECYCLING FILTRATION ASSEMBLY

(71) Applicants: Oleh Kutowy, North Gower (CA); Liubomyr Kutowy, Kemptville (CA)

(72) Inventors: Oleh Kutowy, North Gower (CA); Liubomyr Kutowy, Kemptville (CA)

(73) Assignee: MEMPORE CORP, North Gower Ontario (CA)

( * ) Notice: Subject to any disclaimer, the term of this patent is extended or adjusted under 35 U.S.C. 154(b) by 0 days. days.

(21) Appl. No.: 14/997,143

(22) Filed: Jan. 15, 2016

(65) Prior Publication Data

US 2017/0232394 A1  Aug. 17, 2017

(51) Int. Cl.
    *B01D 63/08* (2006.01)
    *B01D 61/02* (2006.01)
    *C02F 1/44* (2006.01)

(52) U.S. Cl.
    CPC ......... *B01D 63/082* (2013.01); *B01D 61/027* (2013.01); *B01D 2311/14* (2013.01); *B01D 2313/08* (2013.01); *B01D 2313/143* (2013.01); *B01D 2313/146* (2013.01); *B01D 2313/18* (2013.01); *B01D 2319/025* (2013.01)

(58) Field of Classification Search
    None
    See application file for complete search history.

(56) References Cited

U.S. PATENT DOCUMENTS

| | | | | |
|---|---|---|---|---|
| 2,453,613 A | * | 11/1948 | Babbitt | B01D 25/12 210/228 |
| 3,847,818 A | * | 11/1974 | Madsen | B01D 63/084 210/321.84 |
| 5,002,667 A | * | 3/1991 | Kutowy | B01D 63/084 137/561 A |
| 5,176,828 A | * | 1/1993 | Proulx | B01D 63/082 210/321.75 |
| 5,451,317 A | * | 9/1995 | Ishida | B01D 61/18 210/150 |
| 5,624,555 A | * | 4/1997 | Kutowy | B01D 63/084 210/224 |
| 5,624,556 A | * | 4/1997 | Kutowy | B01D 63/084 210/231 |
| 6,224,766 B1 | | 5/2001 | Yamato et al. | |
| 6,251,271 B1 | * | 6/2001 | Hagqvist | B01D 65/08 210/195.2 |

(Continued)

*Primary Examiner* — Krishnan S Menon

(57) ABSTRACT

A filtration system suitable for recovering base stock from used lubricating oil and other applications pass feedstock over nano-filtration membranes assembled as a stack of membranes all experiencing parallel flow. On exiting a first stack of membranes the feedstock passes through an opening in a pressure-sustaining separator plate to flow in the reverse direction past a second stack of membranes and subsequently establish a serpentine flow of feedstock through multiple stacks of membranes. The stacks of membranes all share a common pressure containment vessel. Pressure boosters installed in the flow-through openings of separator plates separating consecutive stacks can serve to restore lost pressure of the feedstock and maintain effective permeation of permeate through the membranes. A pressure control valve at the outlet to the permeate-receiving cavities of a stack can be used to adjust the trans-membrane pressure.

22 Claims, 8 Drawing Sheets

(56) References Cited

U.S. PATENT DOCUMENTS 6,641,726 B1 * 11/2003 Sebastian ............. B01D 25/164
100/197
8,685,252 B2 * 4/2014 Vuong ................... B01D 61/04
210/321.7

* cited by examiner

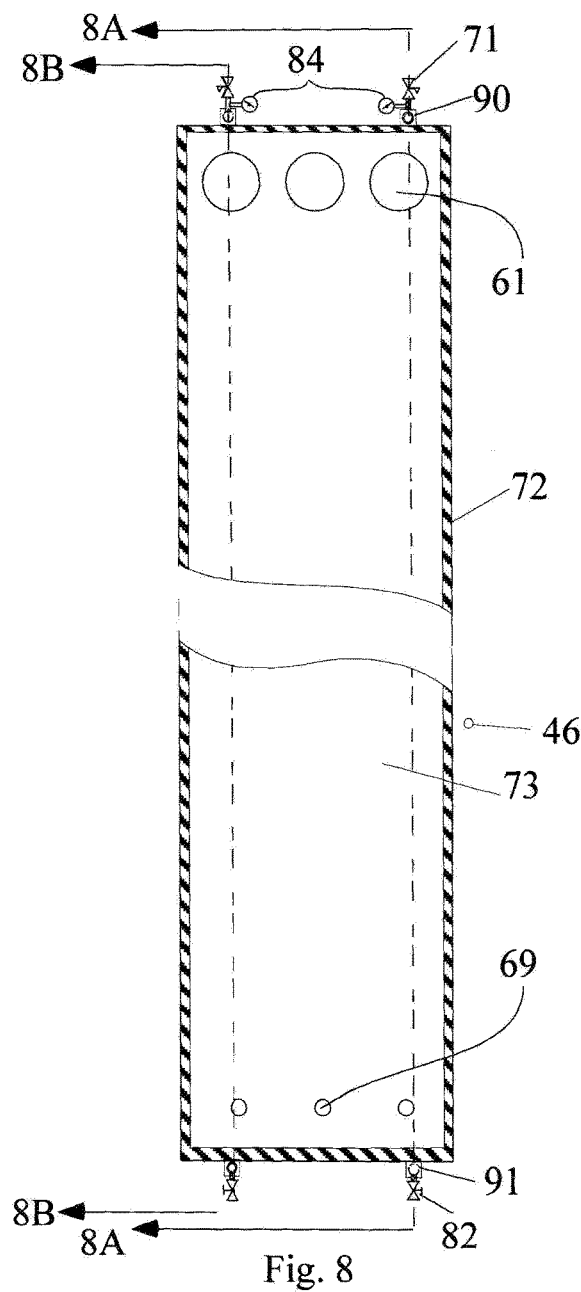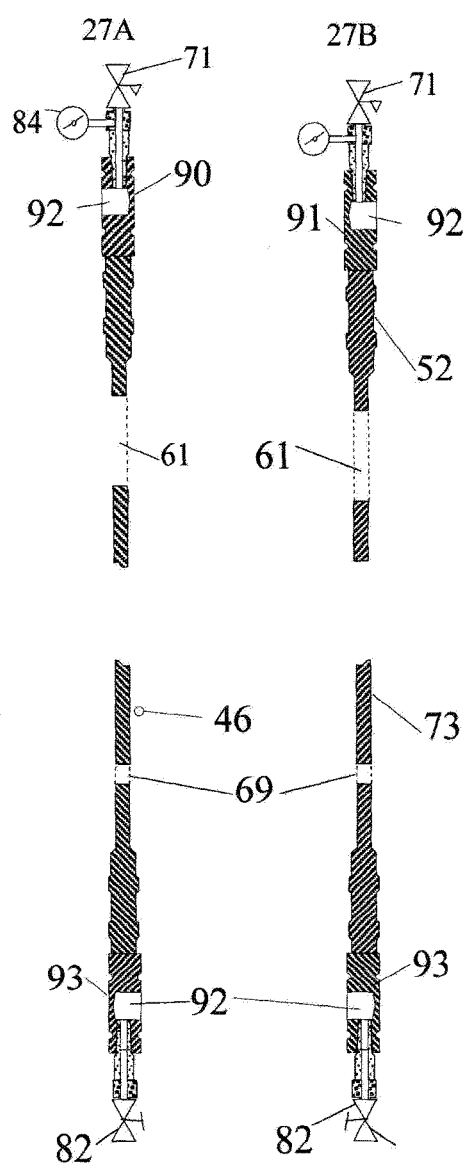
Fig. 8    Fig. 8A    Fig. 8B

USED OIL RECYCLING FILTRATION ASSEMBLY

This applications claims the benefit and priority rights associated with Canadian patent application CA 2,883,468 filed Mar. 3, 2015.

FIELD OF THE INVENTION

The invention relates to an apparatus for separating fluid mixtures by filtration membranes which are arranged into membrane stacks in a supporting frame. More specifically this invention describes equipment and procedures using nano-filtration membranes for cleaning used oil to bring it back to a starting base stock for possible reuse. The invention also has applications in other fields where a filtrate or permeate is to be extracted from a feedstock. This includes, for example, dewatering food-containing liquids to produce concentrates and the purification of gelatin to high standards. Other applications include separating lighter hydrocarbons from heavier hydrocarbons in the petroleum industry.

BACKGROUND TO THE INVENTION

A useful technology for recovering usable base stock from used lube oil can employ nano-filtration membranes. Colloquially, a process based upon use of open osmosis membranes can be referred to as "nano-filtration". However use of such membranes is distinguishable from "filtration" in the following respects: separation of fluids takes place at the membrane surface based on attractions and repulsions of specific dissolved chemical moieties; this is not a filtration of solid particles in the traditional sense. This is instead analogous to reverse osmosis.

Accordingly, although the expressions "nano-filtration", "micro-filtration", "ultra-filtration", "hyper-filtration", "filtrate", "permeate", "filtering medium" may be used in the course of this disclosure, these expressions are actually intended to extend to the case where there is a separation of a liquid stream into a permeate and a concentrate by any analogous process. The invention is not limited to the use of a specific type of membrane.

Lubricating (lube) oils consist of a starting base stock and an additive package. The inherent value of lube oil has led to many attempts at reclaiming the base stock from used lubricating oil with varying levels of success. One technique is to pass the used oil, appropriately pre-conditioned, over a nano-filtration membrane.

Attempts at using commercially available membrane containment systems include the DDS (De Danske Sukkerfabrikker) plate and frame equipment described in U.S. Pat. No. 3,872,015.

A previous patent to Kutowy et. al. U.S. Pat. No. 4,814,088 of Mar. 21, 1989 addresses a membrane-based ultrafiltration process to clean mildly used lube oil as well as crude oil and other chemicals. The contents of this and the following Kutowy US patents are adopted herein by reference.

Other patents to Kutowy et. al., U.S. Pat. No. 5,002,667 Mar. 26, 1991, and U.S. Pat. No. 5,624,555 Apr. 29, 1997 describe using a metallic plate and frame for membrane support. In particular the latter patent describes a paired-membrane panel assembly which incorporates two membranes each overlying a respective permeable, e.g. perforated, membrane support panel located adjacent to the individual membrane's permeate or low pressure side. Such paired membrane support panels are mounted in parallel exposing parallel membranes to feedstock flowing in the same direction.

Feedstock in a membrane system usually requires some pre-treatment. Used lube oil becomes unfit for its purpose due to physical contamination and chemical changes. Water and glycol exist in several forms in used crankcase oil. It is desirable for such contaminants to be reduced to a minimum before a feedstock is exposed to a nano-filtration membrane.

The presence of water and glycol in particular poses a problem to base stock reclamation through small pored membranes such as nano-filtration membranes. This is because of the formation of emulsions that tend to stick and block pores in membranes. Water and glycol have to be virtually completely removed for a nano-filtration membrane-based process to be most effective. Thus the feedstock for a nano-membrane filter should be "membrane compatible" and "feedstock" as used herein is so intended.

Use of nano-membrane filters gives rise to a number of structural requirements for the membrane support structure.

In order to provide a useful quantity of permeate when exposing liquid feedstock to a membrane, the membrane is normally supported to carry a substantial trans-membrane pressure, e.g. on the order of 100 psig. Further, passing a flow of feedstock as a working fluid over a membrane surface under pressure is preferably done in a confined space, e.g., a depth that is preferably only a moderate multiple of the thickness of the membrane and/or the membrane and its supporting perforated panel. This confined space has a preferred depth to maximize the quantity of working fluid that comes into contact with the membrane surface and to maintain flow velocity. ("Fluid" as used herein refers to a liquid unless the context indicates otherwise.) Establishing the correct flow rate over a membrane helps keep the membrane surface clean.

As a consequence of this narrow confinement the working fluid will suffer a pressure drop as it passes as a cross-flow along the length of a membrane. Over a distance of, say, 2 meters in length, the pressure drop could be on order of 10 psig for used lubricating oil, depending on the depth and viscosity of the flowing feedstock layer.

If the working fluid is to be exposed to an extended surface area of membrane, e.g., past multiple supported membrane surfaces connected in series, this cross-flow pressure loss will accumulate. All along the membrane surfaces the pressure must be kept above a minimum pressure, for example 100 psig, to sustain effective permeation. Therefore the entry pressure of the working fluid as it is exposed to the first membrane must, according to one solution, be high enough to accommodate the subsequent pressure losses for the flowing working fluid to maintain the minimum, e.g. 100 psig, pressure needed to force permeate through the membrane at a reasonable rate.

To contain high pressure fluid requires strong frames, sealing plates and seals. Typically these are made of steel. As the requirement for strength goes up (to accommodate higher pressures) the weight of such supporting assemblies increases. This places higher demands on the handling apparatus as well as imposing increased cost.

It would therefore be desirable to provide a support assembly for filter membranes having minimized weight and strength requirements. Correspondingly, the input pressure of the working fluid should be limited to the extent practically possible. This invention addresses such objectives.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one variant, the invention addresses a filtration system embodied in an overall filtration assembly suitable for recovering base stock from used lubricating oil by passing such feedstock over a nano-filtration membrane surface. The invention may also be employed for processing other feedstocks.

In order to produce permeate from a feedstock at least two, i.e. multiple, membrane supports carry respectively membranes, each support having a receiving space within to serve as a cavity or "permeate-receiving cavity", for accepting permeate driven through the membranes by pressure applied to the feedstock, each support also having a permeate-receiving cavity outlet to drain-off permeate. The multiple membrane supports are mounted in a common pressure-containing vessel, hereafter referred to as the "pressure containment vessel", having a feedstock inlet and a concentrate outlet. The pressure containment vessel contains at least one pressure-sustaining separator plate positioned between at least two adjacent membrane supports, the separator plate having a flow-through opening at one end to allow fluid to flow from one membrane support to the next.

The separator plates allow different pressures to develop in consecutive chambers defined by the separator plate(s) that contain the membrane supports, avoiding exposing the membrane supports to a pressure differential that would otherwise arise due to a drop in the pressure of the feedstock as it flows through the system.

The membrane supports panels are preferably formed from two permeable panels, e.g. perforated, mounted back-to-back with two respective membranes located on their outer-facing surfaces. The two permeable panels define between them the receiving space to serve as the permeate-receiving cavity for accepting permeate driven through the two membranes. Collectively these components constitute a panel membrane support assembly, or "membrane panel assembly" for short. In normal usage the feedstock flows in the same direction when passing over the two membranes carried on the respective outer sides of a membrane panel assembly.

Optionally and preferably the respective permeable panels are formed of thin material to reduce weight. Rolled steel sheeting that has been pressed into shape and has been perforated over the greater part of its surface to make it permeable has been found suitable. Use of lightly built membrane panel assemblies is complemented by the structural integrity of the pressure-sustaining separator plates.

While reference is made to the word "panel" this expression is intended to include any form of support, such as a braced mesh, that performs in a similar manner.

Preferably the membrane panel assemblies are themselves assembled in groups as a stack of membrane panel assemblies, all membranes within the stack experiencing parallel flow within the chamber defined by an associated separator plate. On exiting a first stack of membranes, the feedstock passes through an opening in one end of the separator plate to flow past a second stack of membranes. In a preferred arrangement the flow through the second stack is in the reverse direction to the flow through the first stack, being located adjacent to the first stack but separated therefrom by the separator plate.

The stacks of membrane panel assemblies can all share the common pressure containment vessel. A system can be arranged to rely upon the serpentine flow of feedstock through multiple stacks of membrane panel assemblies within that vessel. As a further feature of the invention pressure boosters installed in the flow-through openings of separator plates separating consecutive or alternate stacks can serve to restore lost pressure of the feedstock and maintain effective permeation of permeate through the membranes.

The two panels of a membrane panel assembly define between them the receiving space or "permeate-receiving cavity" for accepting permeate driven through the two membranes by outside pressure, e.g., 100 psig. This permeate-receiving cavity, which serves as a permeate collection chamber, has an outlet to drain-off permeate ensuring that the membrane has a low or limited back-pressure. This cavity may contain spacer members that function as a strut support to minimize deflection of the panels. Collectively these components constitute the "membrane panel assembly".

This structure can be further incorporated into the following useful configurations.

Multiple Membrane Panel Assemblies

Generally, a filtration assembly to produce a permeate from a feedstock in accordance with the invention may comprise the following features:

a. multiple membrane panel assemblies are mounted in the common pressure containment vessel with the membrane panel assemblies arrayed in a parallel configuration. The feedstock flows in the same direction on both sides of each membrane panel assembly for the length of that membrane panel assembly. Collectively the multiple membrane panel assemblies constitute the "stack" of membrane panel assemblies.

b. at one entry end of the pressure containment vessel the first stack receives feedstock from an inlet mounted on the pressure containment vessel. The distribution of the flow of feedstock around individual membrane panel assemblies within each stack is facilitated by passageways within the pressure containment vessel that ensure relatively equal distribution. These passageways may be in the form of sealed penetrations through the membrane panel assemblies at their ends. The sealing around such passageways confines permeate to the permeate-receiving cavity. At another exit end of the stack, feedstock passes through similar flow distribution passageways or openings to the next stack. After exposure to the membranes of all membrane panel assemblies in all of the stacks the feedstock is ultimately delivered to an outlet mounted on the pressure containment vessel for transfer to the next stage of processing.

The parallel arrangement of membrane panel assemblies within each stack reduces the net pressure drop between the inlet and the outlet portions of the stack.

The permeate which penetrates through the membranes into the respective individual permeate-receiving cavities exits through a permeate-receiving cavity outlet from each membrane panel assembly into a manifold connected to all such collection chambers in the stack. The manifolds of all the stacks collect and deliver the permeate from the filtration assembly to an external storage vessel. The individual manifolds may be built onto the bordering portions of an assembly of frames into which individual membrane panel assemblies are mounted. The manifold may terminate at a separator plate which provides an outlet to the external environment.

To locate the membrane panel assemblies within the pressure containment vessel, each membrane panel assembly can be constructed so that it is bounded by an individual frame. The frames are then positioned side by side with the perimeters of their respective membranes pinched there between. The frames are then clamped tightly together by exterior bolts. This provides a portion of the outer wall of the pressure containment vessel. This assembly of the frames secures the membranes in place. The thickness of these peripheral frames also determines the inter-panel assembly spacing which defines the depth of feedstock passing over the membrane surfaces.

Series Flow

A filtration assembly may contain more than a single stack of parallel membrane panel assemblies. Such stacks can be arranged in series to form a bank of such stacks.

Instead of each stack in a bank having its own pressure vessel, they may all share a common pressure containment vessel, each consecutive stack being separated from an adjacent stack of membrane panel assemblies within the pressure containment vessel by a pressure-supporting separator plate. Each separator plate has a flow-through opening at one end to allow fluid to flow from one stack of membrane panel assemblies to the next. This opening will be proximate to the exit end of a first stack and positioned next to the inlet end of the next stack. In this arrangement the direction of feedstock flow is reversed in consecutive stacks.

By assembling a bank of at least two stacks of membrane panel assemblies in this manner, a series flow of feedstock over membrane surfaces in each stack may be achieved. The number of stacks of membrane assemblies so connected may be increased along with inclusion of further separator plates so long as the trans-membrane pressure drop is sufficient to support adequate filtration. Conveniently the feedstock may flow in a serpentine manner through three or more stacks in a bank so configured.

Pressure Boosting

In the configuration as described there will be a cumulative pressure loss for the working fluid as it passes along the length of consecutive stacks of membranes within a bank. This would normally require that a high pressure be maintained at the inlet to the bank of filters. Operating containers at elevated pressures have strength requirements and sealing problems that are inconvenient to address.

Advantageously to address this problem, the separator plate flow-through opening(s) may be provided with an inter-stack pressure booster mechanism or "pressure booster" to restore lost pressure. This pressure booster can be in the form of propeller or turbine-like blades or other form of pressure booster that is mounted in the flow-through opening(s) in one or more separator plates. Such openings may be dimensioned to be close-fitting to the periphery of the impeller, i.e. being circular, to support the pressure differential being formed. The pressure boosters may be actuated by individual electric motors or they may be mounted on one or more rotating shafts that are driven from outside the pressure containment vessel.

In a case where a bank of stacks contains three or more stacks with the consecutive stacks separated by two or more separator plates, multiple pressure boosters may be installed in the flow-through openings in each of the respective separator plates. However, consecutive separator plates need not necessarily be so equipped. Optionally only every second separator plate may be provided with a pressure booster at one end. This arrangement facilitates mounting consecutive pressure boosters on a single, shared rotating shaft.

In order for individual pressure boosters to be mounted on a common rotating shaft, the respective flow-through openings in such separator plates should be aligned. The penetrations of the shaft through the wall of the pressure containment vessel, and the consecutive intervening separator plates where such plates are penetrated, should all contain seals that will limit pressure leakage.

In this manner an indefinite number of sets of membrane panel assembly stacks may be arranged in series without the necessity of raising the inlet pressure to inconvenient levels.

Permeate Back-Pressure Control

An important consideration when assembling multiple stacks of membrane panel assemblies in respective chambers all connected in series within a common pressure containment vessel, is to control the pressure differential across the membranes. Typically membranes have a preferred range of trans-membrane pressure, e.g., about 100 psi.

If, in order to accommodate progressive pressure loss as the feedstock passes through multiple stacks of membrane panel assemblies connected in series, it is elected to provide feedstock to the pressure containment vessel inlet at a moderately elevated pressure, e.g. 130 PSI, then it may be practical to have feedstock flow through a few, e.g., 2 or 3, stacks with the feedstock pressure dropping consecutively from stack to stack. The membranes in the initial stack will be exposed to an elevated trans-membrane pressure, but this may be at a level that is tolerable. However, when a larger number of stacks is employed in a series arrangement it is preferable to maintain the trans-membrane pressure at its preferred operating level. In cases where the inlet feedstock pressure is particularly elevated, it may be necessary to protect the membranes from exposure to an excessively elevated feedstock pressure.

An arrangement with this objective is to control the back-pressure within the permeate-receiving cavities of at least some of the stacks of membrane panels assemblies.

In the proposed configuration, the permeate outlet from each membrane panel assembly in a stack delivers permeate to a stack manifold that collects the permeate drainage from the individual membrane panel assemblies. Conveniently this collection system may deliver permeate to a separator plate at the end of the stack. This separator plate then provides a passageway for the permeate to exit the pressure containment vessel. The outlet from this separator plate can be provided with a back-pressure control valve having an associated pressure sensor and valve control system. This valve can adjust the back-pressure in the permeate-receiving cavities within the associated stack, placing the trans-membrane pressure for all membrane panel assemblies within the stack within a desired range.

The foregoing summarizes the principal features of the invention and some of its optional aspects. The invention may be further understood by the description of the preferred embodiments, in conjunction with the drawings, which now follow.

Wherever ranges of values are referenced within this specification, sub-ranges therein are intended to be included within the scope of the invention unless otherwise indicated or are incompatible with such other variants. Where characteristics are attributed to one or another variant of the invention, unless otherwise indicated, such characteristics are intended to apply to all other variants of the invention where such characteristics are appropriate or compatible with such other variants.

SUMMARY OF THE FIGURES

FIG. 8 is a face view of a separator plate showing the permeate collection structure.

FIG. 8A is cross-sectional edge view of FIG. 8.

FIG. 8B is a further cross-sectional view of FIG. 8 showing a mirror image arrangement of the permeate collection structure of FIG. 8.

DESCRIPTION OF THE PREFERRED EMBODIMENTS

Figure 1:
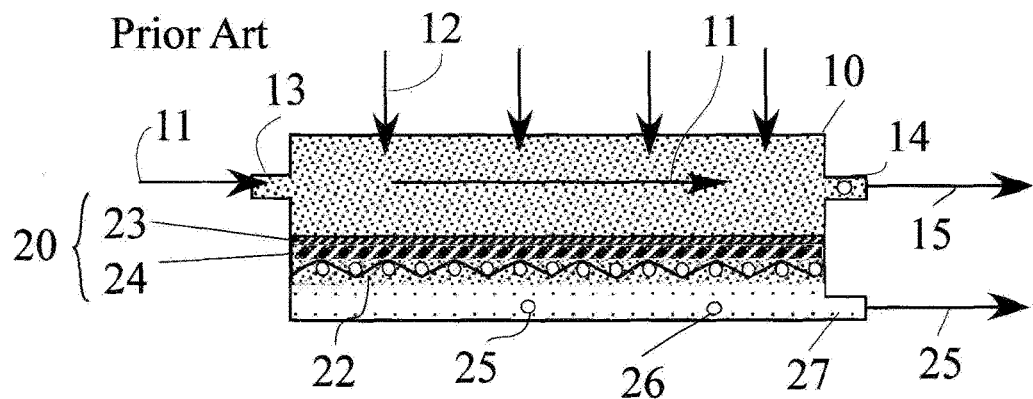
FIG. 1 is a schematic cross-sectional view through a nano-membrane over which is flowing in cross-flow a feedstock which provides a permeate that passes through the membrane. This figure is intended only as a conceptual introduction and is marked as "Prior Art".

In FIG. 1 a schematic pressure containment vessel 10 contains feedstock 11 flowing under pressure 12 from an inlet 13 to an outlet 14 where it exits as a concentrate 15 depleted of permeate 25. Inside the schematic pressure containment vessel 10 a membrane 20 is carried by a permeable, e.g. perforated, support 22 shown schematically as wire mesh but in a preferred variant is a perforated metal panel 47. The membrane 20 has a skin 23 and a spongy sub-layer 24. Permeate 25 that has passed through the membrane 20 into a permeate-receiving cavity 26 exits through a permeate outlet 27. The membrane 20 may be cast onto a supporting scrim or carrier sheet (not shown) to give it improved dimensional stability.

The permeate-receiving cavity 26 may contain a permeable cavity propping structure 61 (shown in FIG. 5) to minimize deflection of the permeable support 22. This can optionally be in the form of a further wire mesh that occupies the permeate-receiving cavity 26 and supports the perforated panels 47.

Membranes suitable for use with the invention in a used lubricating oil application are believed to be available from:
Koch Membrane Systems, Inc.
850 Main Street
Wilmington, Mass.
01887-3388
USA
EMD Millipore Corporation
290 Concord Road
Billerica
Mass. 01821
United States of America U.S. Pat. No. 4,818,088 also describes a nano-membrane for use with aliphatic hydrocarbon liquids suitable for incorporation into the invention described herein in such application.

System Layout

Figure 2:
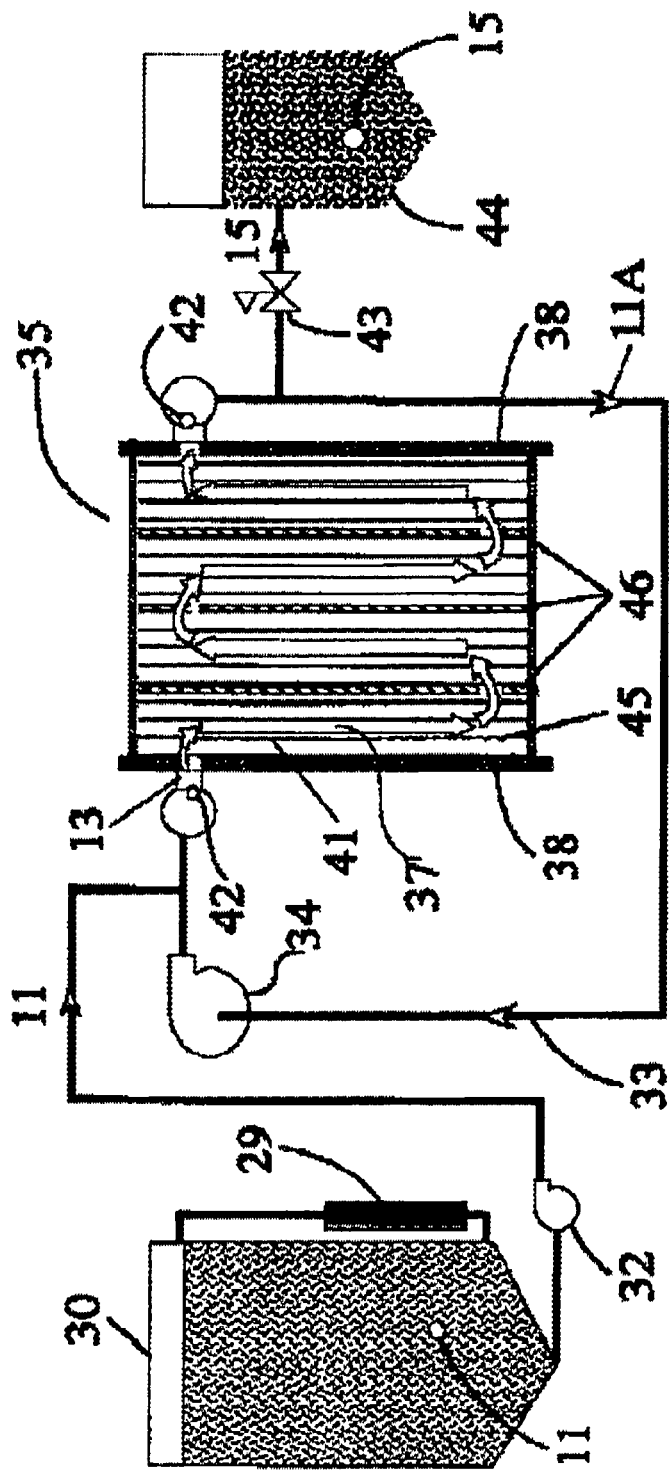
FIG. 2 is a schematic cross-sectional depiction of the layout of a pressure containment vessel and external supporting components, indicating the flow of feedstock through multiple chambers divided by separator plates in the context of a used oil recycling operation. Membrane panel assemblies in FIG. 2 are depicted schematically as lines for clarity of depiction.

In FIG. 2 a holding tank 30 contains a supply of appropriately pre-treated feedstock 11. A heater 29 adjusts the temperature of the feedstock 11 in the tank 30 to preferably around 90° C., e.g. 80°-110° C. in the lube oil application. Feedstock 11 is then delivered by a feedstock delivery and pressurizing pump 32 to a loop system 33 that extends through a multiple membrane pressure containment vessel 35, hereafter "pressure containment vessel", bounded by end plates 38. The circulating feedstock 11A within the loop system 33 is circulated and kept pressurized by a circulating pump 34 until the desired amount of permeate has been extracted.

Feedstock 11 enters the pressure containment vessel 35 bounded by end plates 38 at an inlet 13. This inlet 13 is fitted with an inlet diffuser 42 to distribute the flow amongst the membrane-supporting panel assemblies 41, hereafter "membrane panel assemblies", within the pressure containment vessel 35. Initially the hot feedstock 11 heats the apparatus while being circulated at low speed. Then the circulation rate and pressure within the loop 33 can be increased to process the feedstock 11 more rapidly.

The pressure containment vessel 35 includes a series of individual membrane panel assemblies 41 (depicted schematically as lines 41 in FIG. 2) around which the circulating feedstock 11A passes in a serpentine flow path 37. In this schematic figure, four stacks 45 of membrane panel assemblies 41 are depicted as being exposed to liquid flow. Each stack 45 is separated from adjacent stacks 45 by a pressure-supporting separator plate 46. Aligned with the passageways 50 (in FIG. 3) in the membrane panel assemblies 41 are flow-through openings 68 (in FIG. 6A) in the separator plates 46 allowing the feedstock 11 to pass from stack 45 to stack 45.

At the outlet of the pressure containment vessel 35, outlet collector 42A guides partially concentrated circulating feedstock 11A as it exits from the pressure containment vessel 35. Fully depleted concentrate 15 from the loop 33 exits through a back-pressure control valve 43 for delivery to a processed-concentrate 15 holding tank 44.

Figure 3:
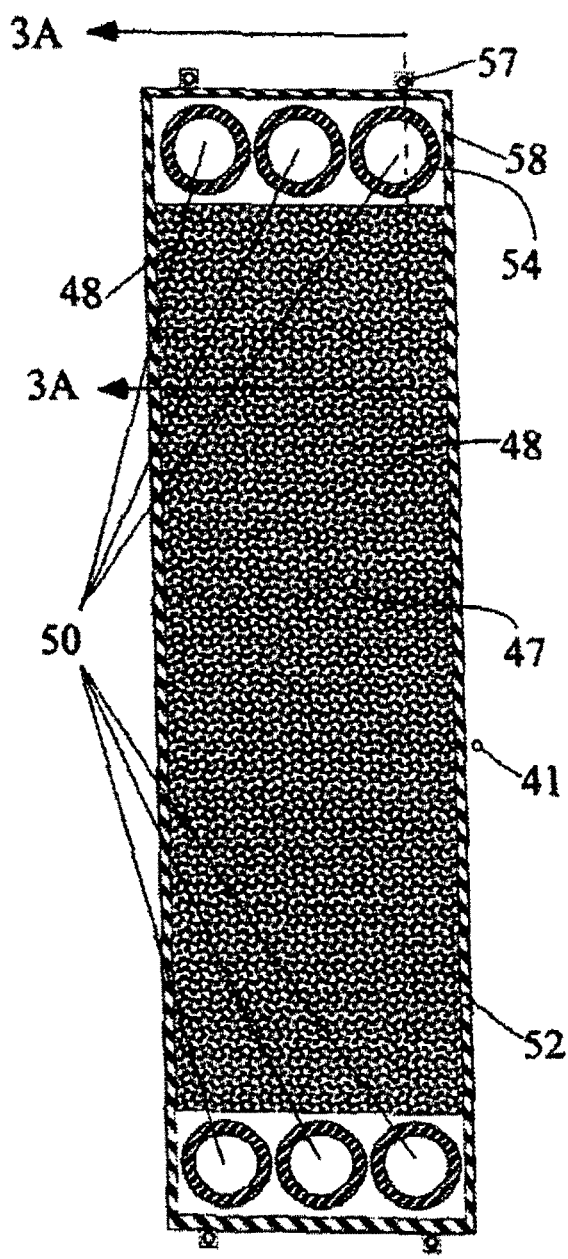
FIG. 3 is a face view of a basic membrane panel assembly with its individual frame assembly.
Figure 5:
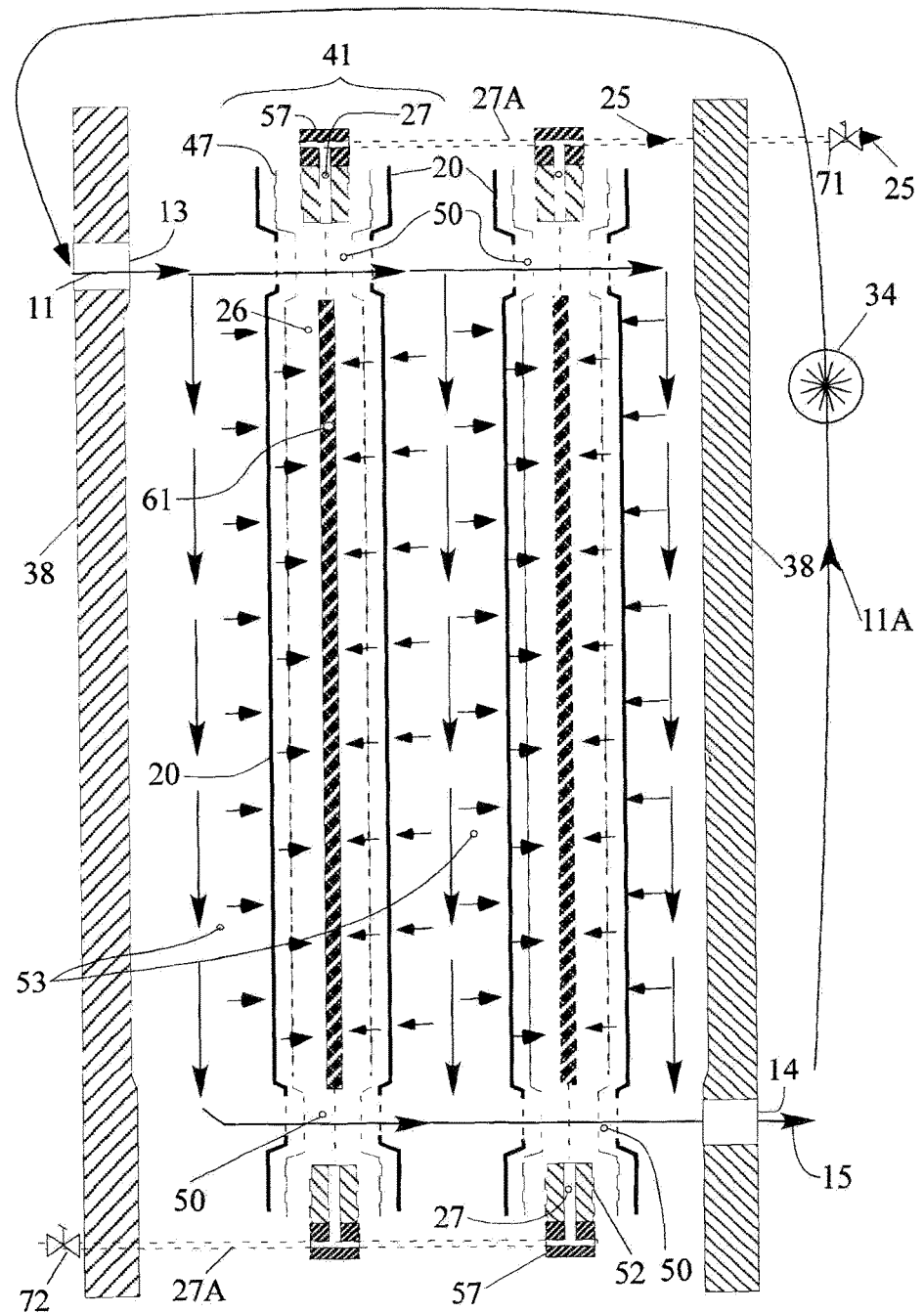
FIG. 5 shows a further schematic exploded cross-sectional view of a stack of membrane panel assemblies as in FIGS. 3-4 showing the flow of feedstock and permeate. In this figure the feedstock follows a parallel path over the membrane surfaces of two membrane panel assemblies before being recirculated. Details of the permeate manifold and exit passageways are shown in FIG. 8.

As shown in FIG. 3 a membrane panel assembly 41 has two perforated panels 47 for supporting respective membranes 20 (shown in this FIG. 3A) on their outside surfaces. The perforations 48 optionally terminate before reaching the ends of the assembly 41. Circular passageways 50, shown as an exemplary three at each end, penetrate the two perforated panels 47 near their respective ends where the perforated panels 47 are preferentially pressed into contact with each other. Clamping circular sealing rings 54 bound the passageways 50 ensuring the integrity of the permeate-receiving cavity 26 (in FIG. 3A) between the two perforated panels 47. Permeate conduits 58 along the panel perimeter at the collapsed ends allow permeate 25 to flow from the permeate-receiving cavity 26 along the periphery of the perforated panel-pair 47 (in FIG. 3A) to exit through permeate outlets 27 at one or more of the ends of the perforated panels 47 and into permeate manifold 27A (FIGS. 3A and 5).

Figure 3A:
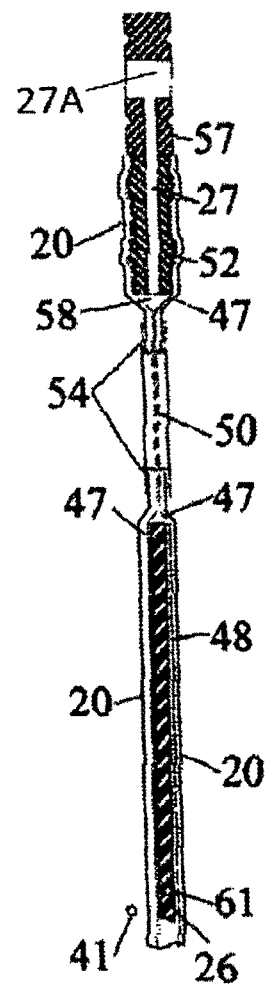
FIG. 3A is a cross-sectional side view through FIG. 3.

As best shown in FIG. 3A, pinched between the two perforated panels 47 along their outer peripheries is a stiffening frame 52, preferably of welded steel and of rectangular cross-section. This frame 52 stiffens the perforated panels 47. The frame 52 also acts as a spacer between perforated panels 47 and provides part of the wall of the pressure containment vessel 35. The outer edges of a membrane 20 (not shown in FIG. 3 but shown as a line in FIG. 3A) on each perforated panel's 47 outer boundary is also pinched between perforated panels 47 and frames 52 under the compressive force of exterior bolts 56 when everything is assembled. Such bolts 56 (in FIG. 4) extend between the end plates 38 around the periphery of the pressure containment vessel 35.

In FIG. 3A the membrane 20 is pinched around the passageway 50 by the sealing rings 54. The permeate-receiving cavity 26 receives permeate 25 from the feedstock 11. This pinching seal may be enhanced by the use of a gasket (not shown) which will not only isolate the inner permeate-receiving cavity 26 from the feedstock flow 11 but will also help pinch the membrane 20 in place under the sealing ring 54.

Permeate conduits 58 can run adjacent to the inner portion of the frame 52 to carry permeate 25 to the ends of the membrane panel assemblies 41.

Figure 4:
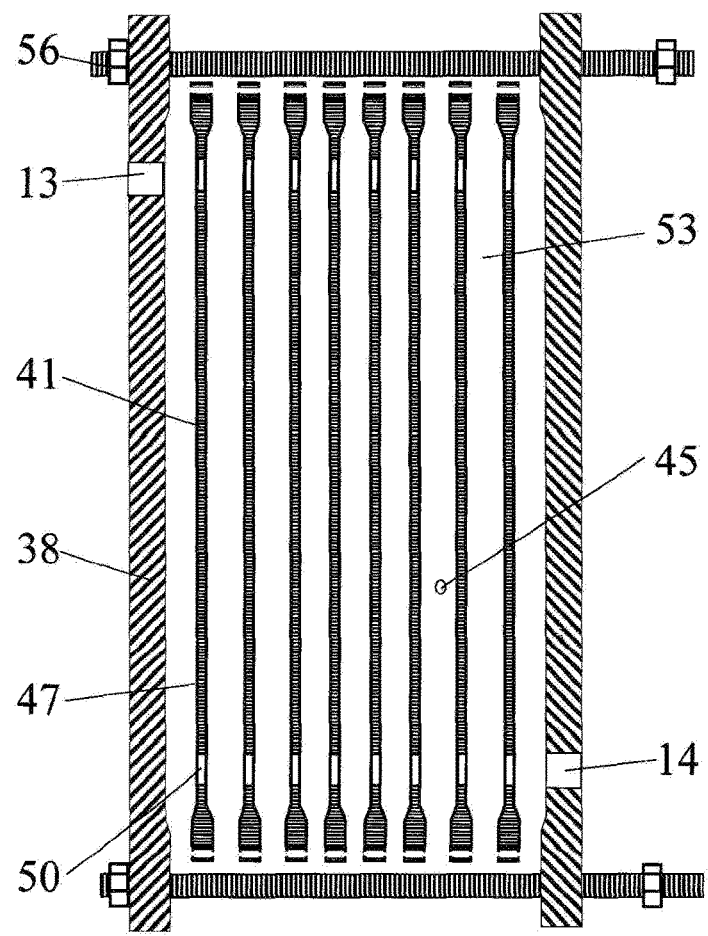
FIG. 4 is a cross-sectional exploded schematic view of a stack of membrane panel assemblies of the type as in FIG. 3 in an expanded state before compression to form a pressure containment vessel.

In FIG. 4 a single stack 45 of two individual membrane panel assemblies 41 is located within the containment of the pair of end plates 38 held together by bolts 56. Collectively, these end plates 38 and the peripheries of the membrane panel assemblies 41 define the pressure containment vessel 35.

Individual membrane panel assemblies 41 have passageway openings 50, also shown in plain view in FIG. 3, to allow parallel flow of feedstock 11 to be distributed in the spaces or gaps 53 between membrane panel assemblies 41. These gaps 53 provide a "headspace" for feedstock 11 over the membrane 20. Conveniently, in FIGS. 4-7 these passageway openings 50 are shown as aligned openings in the membrane panel assemblies 41 to accommodate a feature described further below.

The height of the headspace provided by the gaps 53 has an important effect on the operation of the system. As this headspace 53 gets narrower, the pressure drop along a given length of membrane 20 will increase. If higher feedstock pressures are used, then, for a given gap height 53, the feedstock 11 flow rate will be higher. This flow rate will help "scrub" non-passing feedstock matter off the surface of the membrane 20, reducing membrane blockage. At the same time, such over-pressure can affect "concentration polarization" on the surface of the membrane. This has the consequence of thickening the boundary layer of fluid flow over the membrane, which will reduce permeate flow. For this reason trans-membrane pressure should not be allowed to become excessive.

FIG. 5 shows the path of flow of feedstock 11 and permeate 25 in between and around a pair of membrane panel assemblies 41. Also as shown in FIG. 5, the cavity 26 contains a permeable cavity propping structure 61 to minimize deflection of the perforated panel 47.

In FIG. 5 permeate 25 is shown as flowing through the permeate outlet 27 penetrating the frame 52 at the upper end of the individual membrane panel assemblies 41. The permeate 25 is gathered through tabs 57 into a manifold 27A of tubes for eventual further disposal as shown in FIG. 8. Permeate 25 exiting from each stack 45 of membrane panel assemblies 41 eventually passes through a back-pressure control valve 71 that is adjusted to maintain the pressure drop across the membrane 20 in the associated stack 45 of membrane panel assemblies 41.

Serpentine Flow

Figure 6:
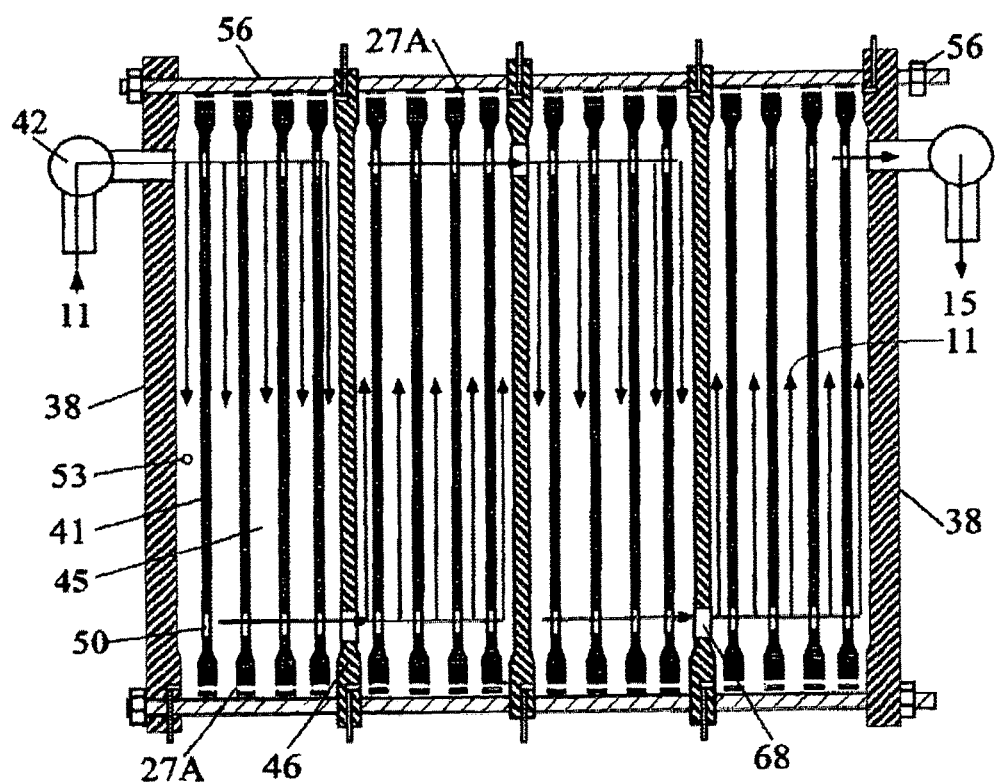
FIG. 6 is a schematic exploded cross-sectional view of a bank of four stacks of membrane panel assemblies as in FIG. 3-5 with permeate manifold passageways top and bottom.

In FIG. 6 multiple sets or "stacks" 45 of membrane panel assemblies 41 are assembled to permit direction-reversing flow of feedstock 11 through consecutive stacks 45. As in FIGS. 4-6, end plates 38 of the pressure containment vessel 35 are shown but, for convenience of depiction, the membrane panel assemblies 41 are shown as being separated before the bolts 56 apply a compacting force. In actual use, the bolts 56 are tightened with the frames 52 dimensioned at the boundaries of the membrane panel assemblies 41 to allow the bolts 56 to draw the membrane panel assembly ends together. This action also secures the membrane 20 in position on the pair of associated membrane panel assemblies 41, pinching these components together while providing the spacing between panels that establishes the inter-panel gap and headspace 53.

In FIG. 6 separator plates 46 are present between consecutive stacks 45 of membrane panel assemblies 41. As shown in FIG. 8 the perimeter 72 of a separator plate 46 is shaped and dimensioned similarly to that of the membrane panel assemblies 41 to ensure the integrity of the pressure containment vessel 35. Within this perimeter 72 the face surfaces 73 of the separator plates 46, as with the end plates 38, may be slightly inwardly displaced to provide headspace 53 for the membrane 20 on adjacent membrane panel assemblies 41.

Pressure Boost

Figure 7:
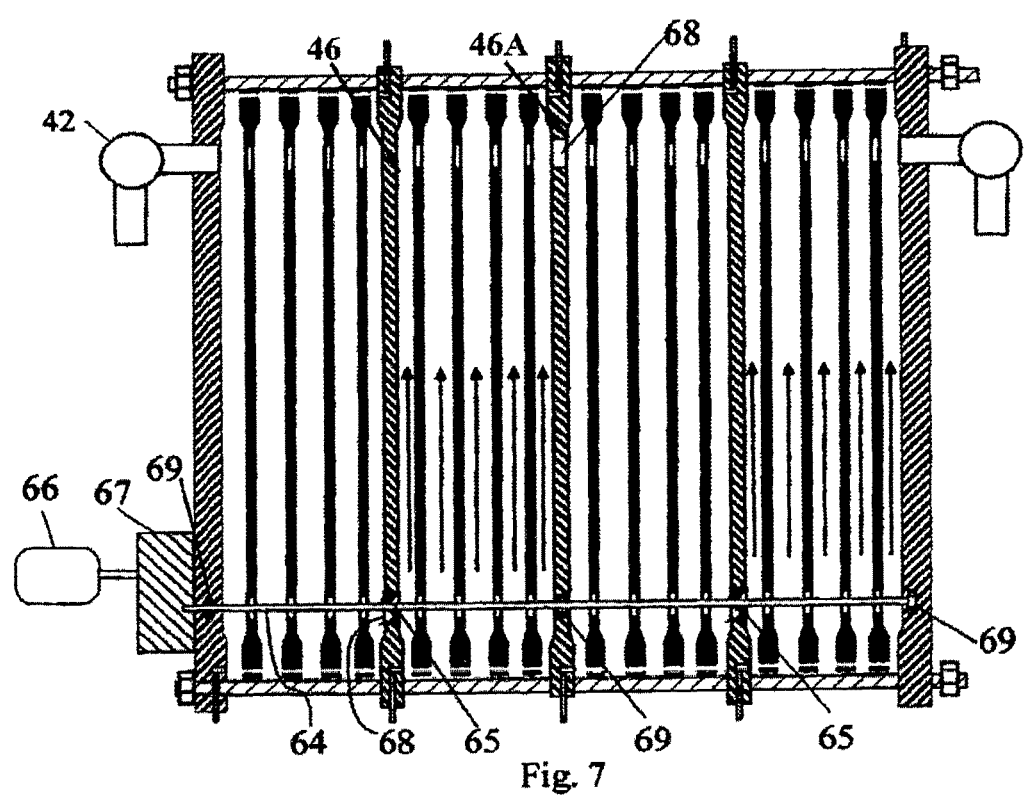
FIG. 7 is a further view as in FIG. 6 having additionally present pressure boosters in the form of multiple turbine blades mounted on a common shaft within the respective flow-through openings of two of the separator plates.

In FIG. 7 the flow-through openings 68 in the separator plates 46 are penetrated by a rotating shaft 64 passing therethrough. Mounted on such shaft 64 in the flow-through opening 68 in every second separator plate 46 is a pressure booster 65 in the form of a fluid impeller. The seal 69 where the shaft 64 pierces the intermediate separator plate 46 is intended to be pressure-tight.

The shaft 64 is turned through a transmission 67 by an external electric motor 66. Thus, as the feedstock 11 passes from stack 45 to stack 45 in the bank of stacks, its pressure is boosted, making-up for the pressure loss incurred by flowing in a cross-flow over the surface of the membranes 20. The motor 66 may be a variable speed motor to control the amount of the pressure boost. Although a common shaft 64 is shown as actuating the pressure boosters 65, each pressure booster 65 could have its own individual electric motor.

As depicted in some of the Figures so far for the individual membrane panel assemblies 41 and separator plates 46, reference has been made to an opening, (in the form of a passageway 50 (in FIG. 4) or flow-through opening 68 (in FIG. 7)), respectively formed in the membrane panel assemblies 41 and separator plates 45 near their ends. In fact multiple such openings 50, 68 may be present side by side to support a high flow rate through such openings 50, 68. Singly or collectively such openings qualify as a passageway 50 or a flow-through opening 68. In the case of multiple flow-through openings 68, multiple pressure boosters 65 should occupy the openings 68 to maintain the pressure boost.

In FIG. 7 the multiple pressure boosters 65 are positioned at the bottom of the first and third, and in expanded variants, in all odd numbered separator plates 46. The second separator plate 46B and all even numbered separator plates 46 each have a penetration with a pressure-tight bearing to provide the seal 69 for the shaft 64, or multiple shafts 64 in the case of multiple openings 50, 68.

In configurations where the pressure drop within the flow of feedstock 11 is significant, e.g. the length of cross-flow along the membranes 20 in one or more stacks 45 is considerably extended or the feedstock 11 is viscous as in the case of heavy oil, a second set of pressure boosters (not shown) may be installed at the other end of the separator plate 46. Thus further set of pressure boosters 65 may be positioned at the top of the second, fourth and all even numbered separator plates 46. In this separate array of pressure boosters 65, all odd numbered separator plates 46 would have appropriately aligned pressure-tight bearings to provide the seal 69. This second shaft, or set of shafts, would have its own drive mechanism 66, 67 and speed control. For such long panels, the unit could beneficially be positioned on its side.

Trans-Membrane Pressure Control

To dispose of permeate 25 each stack 45 is provided with a first permeate outlet manifold 27A (in FIG. 5) that delivers permeate 25 to a proximate separator plate 46. As shown in FIG. 8 the separator plates have aligned permeate reception tabs 90, 91 corresponding to tabs 57 in FIGS. 3 and 5 and blind recesses 92 (in FIGS. 8A and 8B) that receive the permeate manifold 27A and divert permeate 25 out of the pressure containment vessel 35 through permeate pressure control valves 71. Thereafter permeate 25 flows at near atmospheric pressure for accumulation outside the pressure containment vessel 35. Only one permeate reception tab 90 is needed for a separator plate 46 but by providing two such tabs 90, 91 as mirror arrangements the separator plates 46 can be more versatile, avoiding the need to have "left" and "right" plates 46 on assembly. Each separator plate 46 can thereby receive permeate 25 from the stacks 45 on both or either side.

By providing each back-pressure valve 71 (in FIGS. 8, 8A, and 8B) with a pressure sensor 84 and individual valve controller (not shown), the controller can receive signals from the sensor 84 and deliver signals to control the valve 71. This allows different back pressures to be established for various stacks 45 through which the feedstock 11 is passing at progressively decreasing feedstock pressures 12 if there is no inter-stack pressure boost. The pressure of the feedstock 11 around each stack 45 can be interpolated by knowing the inlet 13 and outlet 14 pressures in order set back-pressure valves 71 to create the preferred trans-membrane pressure differential.

Drain tabs 93 (in FIGS. 8, 8A, and 8B) at the other end of the separator plate 46 can be fitted with manual valves 82 for use when permeate 25 is to be drained from the membrane panel assemblies 41 on disassembly.

The permeate back-pressure control system as described is suitable for providing a preferred trans-membrane pressure when feedstock 11 is delivered to the pressure containment vessel inlet 13 at a significantly elevated inlet pressure level 12. The consecutive pressure-boosting provisions for the individual consecutive stacks 45 described previously as part of this invention can obviate the need to deliver feedstock 11 to the container inlet 13 at an elevated inlet pressure 12. Nevertheless, in order to maintain trans-membrane pressures at reasonable values in either such cases, the permeate back-pressure control system as described can be used to set or fine-tune the trans-membrane pressure for individual stacks 45 by adjusting the pressure of the associated permeate-receiving cavities 26.

Hybrid Separator Plate

Figure 9:
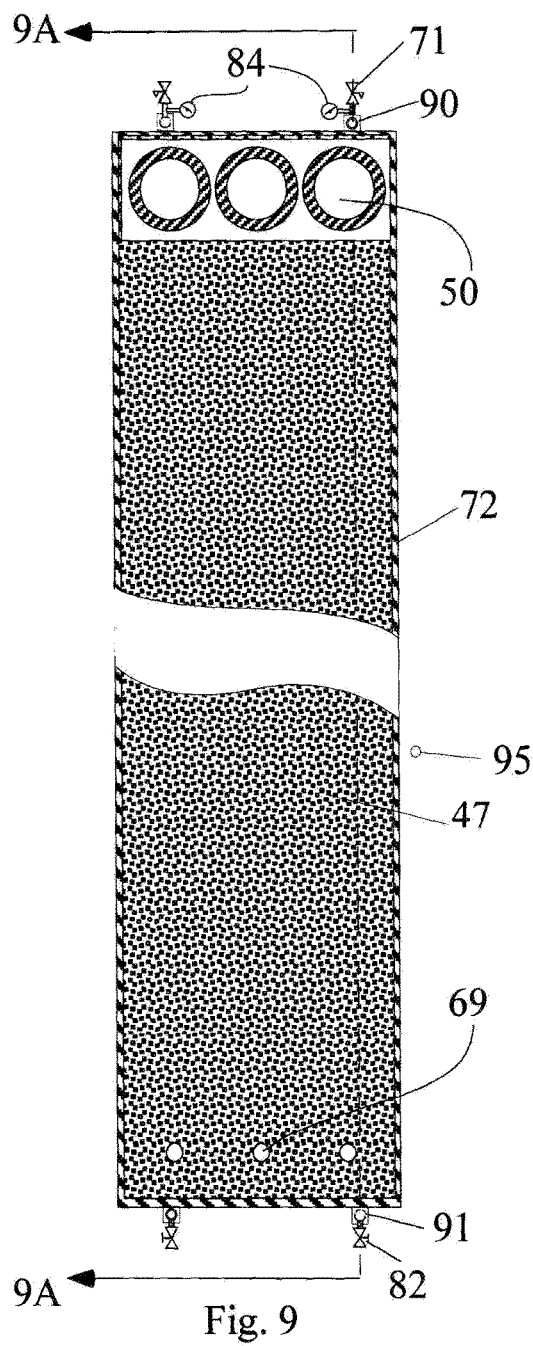
FIG. 9 is a face view of a modified separator plate having a perforated membrane support panel on one side.
Figure 9A:
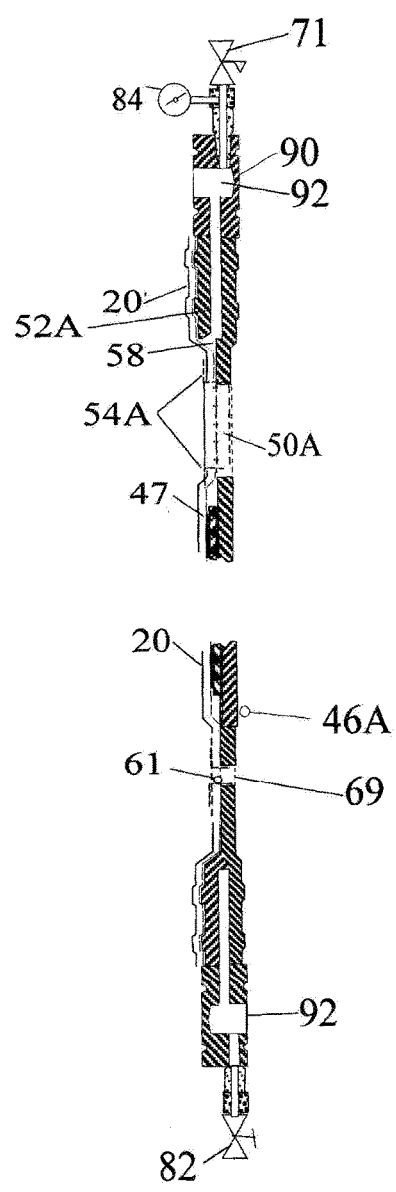
FIG. 9A is cross-sectional edge view of FIG. 8.

The separator plate 46 need not be an independent component. FIGS. 9, 9A show a hybrid separator plate 46A and single perforated panel 47. A perforated panel 47 is mounted on a modified separator plate 46A. Permeate 25 flows directly to the blind recess 92 through the permeate conduit pathway 58 in the modified separator plate 46A. The hole 50 in perforated panel 47 is ringed by a modified sealing ring 54A that engages flow-through opening 68 in the modified separator plate 46A. This modified ring 54A and a shaped portion 52A of the plate 46A is configured as a frame to position the membrane 20 in place. The modified separator plate 46A has a perimeter on one side, shaft penetration 61 and pressure seal 69 as before.

In this variant the lightly built perforated panel 47 is supported and stiffened by the pressure-sustaining modified separation plate 46A providing effectively a stiffened membrane panel assembly 41 with a separator plate 46 embedded therein. If desired the modified separator plate 46A may also be perforated although this may prove costly for a thickened plate.

Number of Panel Assemblies in Each Stack

As the feedstock 11 passes through a series of stacks 45, its pressure will be progressively reduced. At the same time, a portion of its volume will be carried-away in the permeate 25 that passes through the membranes 20. This loss of volume, after a number of stacks 45 have been passed-through will reduce the rate of feedstock 11 flow across membrane 20 surfaces.

To maintain the cross-flow fluid velocity at a desired level, the number of membrane support panel assemblies 41 in later stacks 45 in the series can be reduced. Thus, for example, where the initial stack count includes twenty membrane panels, then after, say, ten stacks in the series, the twenty first stack may have its panel count reduced to nineteen. This process can be repeated if the number of stacks in the series is extended substantially. The values in the example given will vary with the viscosity of the feedstock 11, the length of the membrane panel assemblies 41, the number of stacks in the system and other parameters.

Mounting of Membrane Panel Assemblies

When finally assembled, the membrane panel assemblies 41 and separator plates 46 which provide a portion of the boundaries of the pressure containment vessel 35 are held rigidly in place by the compressive force of the end plates 38 that are drawn towards each other by tightening the peripheral arrangement of bolts 56. This compressive force is high and the integrity of the arrangement once assembled is secure.

During initial assembly, temporary rails may be provided between the two end plates 38 to align individual panels being positioned there between in respect of their vertical position. Spacers located alongside side bolts 56 can ensure proper alignment in the horizontal direction.

In most applications where a pure base stock is required for producing fresh lubricating oil, the permeate 25 may be subject to a final treatment by passing it through a commercially available Polishing Unit that relies on activated clays. It is not represented that the output from the filtration system as describe is absolutely ready for use as a base stock for preparing lubricating oil.

While the above description has focused on an apparatus for recovering base lube oil stock from used lubricating oil, the invention and the apparatus hereinafter claimed is equally applicable to any suitable liquid filtration process that relies on a membrane as the filtering medium.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The invention claimed is:

1. A filtration system to produce a permeate from a liquid feedstock comprising multiple permeable membrane support panels assemblies assembled in stacks, each membrane panel assembly carrying respective permeable filter membranes, each membrane panel assembly having a receiving space within to serve as a permeate-receiving cavity for accepting permeate driven through the membranes by pressure applied to the feedstock and a permeate-receiving cavity outlet to drain-off permeate, wherein
    a) the multiple membrane panels assemblies are mounted in a common pressure-containment vessel, such vessel having walls, a feedstock inlet and outlets for permeate and concentrate, and
    b) the pressure containment vessel contains at least one pressure-sustaining separator plate positioned between at least two stacks of membrane panels-assemblies, the separator plate having a flow-through opening at one end only to allow liquid to flow from one stack of membrane panels assemblies to the next and wherein the at least one separator plate:
        i) is positioned between the two stacks of membrane panels assemblies with its outer periphery serving as part of the walls of the pressure containment vessel,
        ii) provides a separator permeate inlet connected through a manifold to the permeate-receiving cavity outlets of at least one of the two stacks of membrane panels assemblies to receive permeate therefrom, and
        iii) comprises a passageway positioned along the periphery of the separator plate to convey permeate outside the pressure containment vessel through a separator permeate outlet.

2. A filtration system as in claim 1 comprising respective frames within which each membrane panel assembly is mounted, the frames each having outer peripheries that serve, when the membrane panel supports are combined to form stacks, as part of the walls of the pressure containment vessel, wherein the frames of the at least one of the two stacks of membrane panels assemblies or tabs attached thereto provide the manifold for delivery of permeate to the separator permeate inlet.

3. A filtration system as in claim 2 wherein the separator permeate outlet is connected to deliver permeate to a back-pressure control valve having an associated pressure sensor and valve control system for establishing the pressure within the permeate-receiving cavity.

4. A filtration system to produce a permeate from a liquid feedstock comprising multiple permeate membrane support panel assemblies assembled in stacks, each membrane panel assembly carrying respective permeable filter membranes, each membrane panel assembly having permeate-receiving cavity within to serve as a cavity for accepting permeate driven through the membranes by pressure applied to the feedstock and a permeate-receiving cavity outlet drain-off permeate, wherein:
    a) the stacks of multiple membrane panels assemblies are mounted in a common pressure-containment vessel, such vessel having walls, a feedstock inlet and outlets for permeate and concentrate,
    b) the pressure containment vessel contains at least one pressure-sustaining separator plate positioned between at least two stacks of membrane panel assemblies, the separator plate having a flow-through opening at one end only to allow liquid to flow from one stack of membrane panel assemblies to the next, and
    c) the membrane support panel assemblies within each stack comprise frames within which each membrane panel assembly is mounted, the frames each having outer peripheries that serve, when the membrane panel assemblies are combined to form stacks, as part of the walls of the pressure containment vessel,
    and wherein the frames of the membrane panel assemblies comprise tabs attached thereto each having holes that are aligned and interconnected internally to provide a manifold for collection of permeate from the permeate-receiving cavity outlets of the membrane panel assemblies for transfer to outside of the containment vessel.

5. The filtration system as in claim 4 wherein:
    a) the membrane panels assemblies comprise two permeable panels mounted back-to-back with two respective membranes located on their outer-facing surfaces, and
    b) the two panels define between them the receiving space there within to serve as the permeate-receiving cavity for accepting permeate driven through the two membranes by pressure applied to the feedstock,
    thereby constituting the "panel assemblies", and
    wherein the permeate-receiving cavity outlets of the membrane panels assemblies are connected to deliver permeate through the manifold to a back-pressure control valve having an associated pressure sensor and valve control system for establishing the pressure within the permeate-receiving cavities.

6. A filtration system to produce a permeate from a liquid feedstock comprise multiple permeable filter membrane support panels wherein:
    a) the support panels comprise two permeable panels mounted back-to-back with two respective filter membranes located on their outer-facing surfaces,
    b) the two panels define between them a receiving space there within to serve as a permeate-receiving cavity for accepting permeate driven through the two membranes by pressure applied to the feedstock, and
    c) each permeate-receiving cavity is provided with a permeate-receiving cavity outlet to drain-off permeate,
    thereby constituting "panel assemblies", the panel assemblies being combined into at least two stacks of such panels assemblies wherein:
    d) the at least two stacks of panels assemblies are mounted in a common pressure-containment vessel, such vessel having walls, a feedstock inlet and outlets for permeate and concentrate,
    e) the pressure containment vessel contains at least one pressure-sustaining separator plate positioned between the at least two stacks of panels assemblies, the separator plate having a flow-through opening at one end only to allow liquid to flow from one stack of panels assemblies to the next, and f) a pressure booster is mounted in the at least one separator plate flow-through openings to restore pressure between the stacks of panel assemblies.

7. A filter system as in claim 6 wherein the pressure containment vessel comprises at least three pressure-sustaining separator plates and pressure boosters are respectively mounted in the flow-through openings in every other separator plate.

8. A filter system as in claim 7 comprising pressure boosters respectively mounted in the flow-through openings in every separator plate.

9. A filter system as in claim 6 wherein the pressure booster is actuated by an electric motor.

10. A filter system as in claim 7 wherein the pressure boosters are actuated by respective electric motors.

11. A fitter system as in claim 8 wherein the pressure boosters are actuated by respective electric motors.

12. A filter system as in claim 6 wherein the pressure booster is actuated by a rotating shaft driver from outside the pressure vessel.

13. A filtration system as in claim 7 wherein the pressure boosters are actuated by a common rotating shaft driven from outside the pressure vessel.

14. A filtration system as in claim 8 wherein the pressure boosters are actuated by rotating shafts driven from outside the pressure vessel.

15. A filtration system as in claim 13 wherein the common shaft penetrates every other intervening separator plate through a pressure seal.

16. A filtration system as in claim 6 comprising respective frames within which each membrane support panel assembly is mounted, the peripheries of the frames, when the membrane panel assemblies are combined to form the stacks, serving as part of the walls of the pressure containment vessel, wherein the frames of at least one stack or tabs attached thereto are assembled to provide a manifold connected to the permeate outlets of the permeate receiving cavities of each panel assembly for collection of permeate for delivery to an external storage vessel.

17. A filtration system as in claim 16 wherein the at least one separator plate interspersed between the stacks of panels is provided with a conduit connected to the manifold to receive and convey permeate out of the pressure containment vessel.

18. A filtration system as in claim 6 wherein the permeate-receiving cavity outlets of each panel assembly in at least one stack are connected to a stack manifold that is connected to deliver permeate to a back-pressure control valve having an associated pressure sensor and valve control system for establishing the pressure within the permeate-receiving cavity.

19. A filtration system as in claim 6 wherein the permeate-receiving cavity outlets of each panel assembly in at least one stack are connected to a stack manifold that is connected through a passageway positioned along the periphery of the separator plate to deliver permeate to a back-pressure control valve having an associated pressure sensor and valve control system for establishing the pressure within the permeate-receiving cavity.

20. A process for extracting permeate from an apparatus as in claim 1 comprising allowing permeate from the permeate-receiving cavity outlets of the membrane panel assemblies of at least one of the two stacks of otherwise adjacent membrane panels assemblies to flow through the manifold to the at least one separator plate and exit the pressure containment vessel through a passageway positioned along the periphery of the separator plate.

21. A process for collecting permeate from the permeate-receiving cavities of the apparatus as in claim 4 comprising directing such permeate through the manifold formed by the tabs on the frames of the membrane panels assemblies for transfer to outside of the containment vessel.

22. A process for boosting the feedstock pressure of a feedstock as it passes through the consecutive stacks of panel assemblies within a pressure containment vessel as in claim 6 comprising boosting the pressure of the feedstock as it passes through the flow-through opening in the separator plate by causing the feedstock to flow through the pressure booster mounted in such opening.

* * * * *